May 9, 1939.  H. A. SMITT  2,157,465
POWER TRANSMISSION MECHANISM
Filed Nov. 29, 1937  2 Sheets-Sheet 1
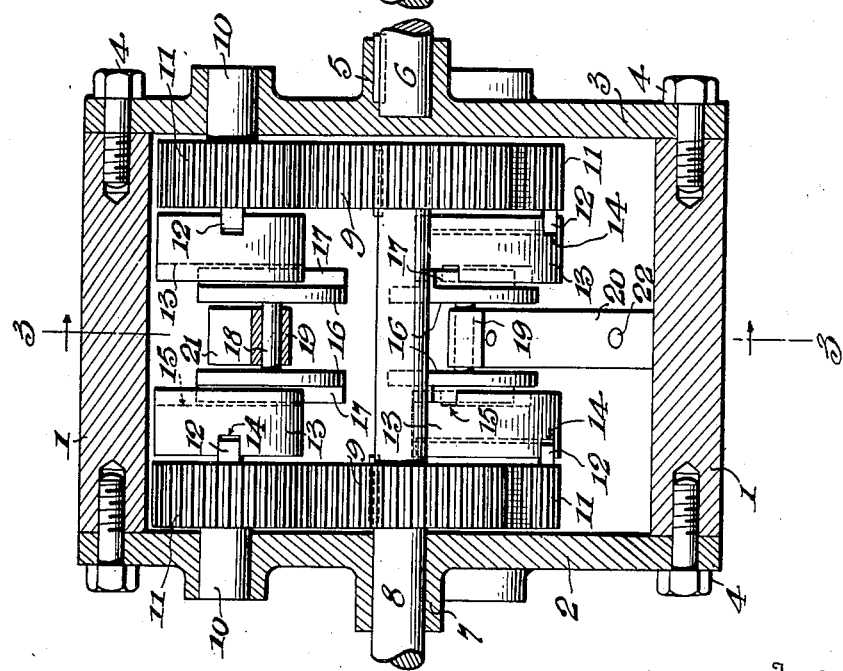
Inventor
Henry A. Smitt
Albert E. Dieterich
and
By Theodore H. Rutley
Attorneys May 9, 1939.  H. A. SMITT  2,157,465
POWER TRANSMISSION MECHANISM
Filed Nov. 29, 1937  2 Sheets-Sheet 2

Inventor
Henry A. Smitt
Albert E. Dieterich
By
Theodore H. Rutley  Attorneys

Patented May 9, 1939

2,157,465

UNITED STATES PATENT OFFICE 2,157,465

POWER TRANSMISSION MECHANISM

Henry A. Smitt, Fort Lewis, Wash.

Application November 29, 1937, Serial No. 177,116

7 Claims. (Cl. 74—260)

My invention relates to power transmission mechanisms, such as are especially adapted for torque conversion between a driving and a driven shaft so as to give an infinite number of speed changes without the necessity of shifting gears.

More particularly the invention has for its object to provide an automatically operating planetary gear transmission mechanism between a driving and a driven shaft where the speed of the driven shaft is automatically controlled by the engine speed and the load.

A further object is to provide a torque converter whose torque plot for all speeds above a maximum idling speed will be a straight line.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be pointed out particularly in the appended claims, reference being had to the accompanying drawings, in which:

Figures 1 and 2 are vertical longittudinal sections illustrating the invention with the parts in two positions 180° apart when running under maximum idling speed.

Figure 4:
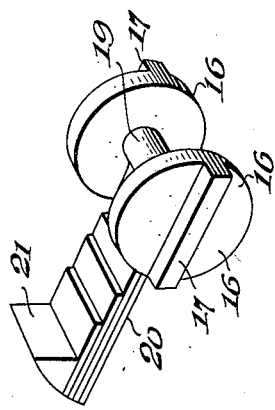
Figure 4 is a detail perspective view of one spring and disc unit.
Figure 5:
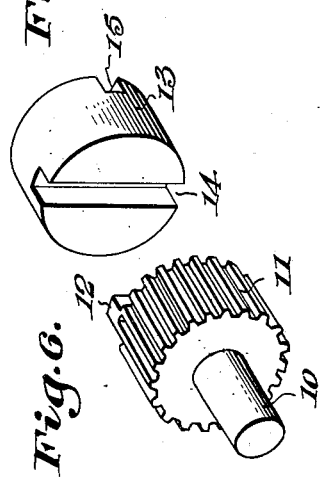
Figure 5 is a detail perspective view of one of the floating discs or cylinders.
Figure 6:
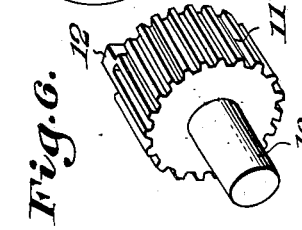
Figure 6 is a detail perspective view of one of the planet gears.
Figure 3:
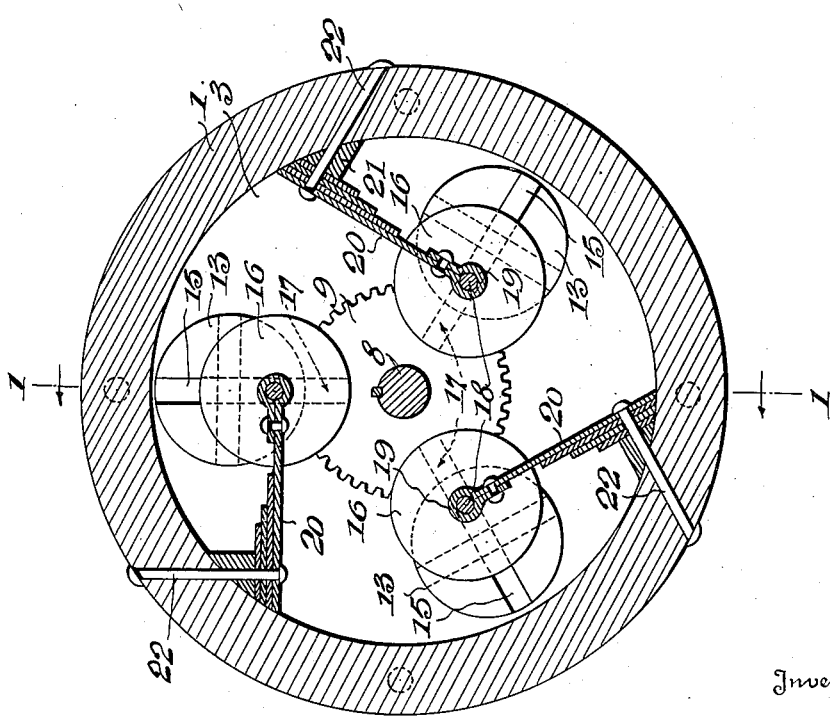
Figure 3 is a cross section on the line 3—3 of Figure 1.

In the drawings, in which like numbers of reference indicate like parts in all the figures, 1 represents the cylindrical wall of the casing, whose ends are closed by plates 2 and 3, that are secured to the annulus 1 by cap screws 4.

The end plates 3 and 2 have hubs 5 and 7, respectively, in the former of which hubs the driving shaft 6 is keyed and through the latter of which hubs the driven shaft 8 passes.

Within the casing formed by the parts 1, 2, 3, the shaft 8 has a pair of sun gears 9 keyed to it and spaced apart, as shown in Figures 1 and 2.

Each plate 2 and 3 has hubs in which the stub shafts 10 of the planet gears 11 are journalled. A plurality (preferably three) planet gears 11 are carried by each plate 1 and 2 to cooperate with the adjacent sun gears 9.

Each planet gear 11 has a rib or feather 12, diametrically disposed, to enter a groove 14 in one face of a floating cylinder or disc 13, the other face of which has a diametrically arranged groove 15 disposed 180° from the groove 14.

Secured by a rivet 22, or otherwise, to the wall 1 of the casing is a leaf spring pack 20 and block 21, the spring pack having a bearing 19 for the shaft 18 that carries two discs 16 having ribs or feathers 17, that of one disc paralleling that of the other disc and both being radially disposed. These feathers 17 enter the grooves 15, before referred to.

There is a spring-pack disc unit (see Figure 4) for each opposite pair of gears 11 and cylinders 13.

The parts 11, 13, and 16 make up what is known as Oldham's coupling. This type coupling permits power to be transmitted from one shaft (as 6 or 8, or as 10, since 10 can be considered to be a "driving" shaft, whether or not it is integral with 11 and its feather 12 as are 16 and 17 with 18) to another parallel but not-in-line shaft (as 18). The masses 13, 13 oscillate in circles the diameter of which are equal to the distance which an extended line, running longitudinally through the centers of 10 and 10, is from an extended line running through the center of 18. The closer the lines are to each other, the smaller are the circles around which the masses oscillate. The diameters of the circles are the distances which the masses 13, 13 are actually displaced toward the center of the transmission against centrifugal force. The distances which the masses are displaced are governed by the tension of the leaf spring, and the centrifugal force (due to masses 16, 16, 18, 13, 13) generated by the revolving of the transmission. The higher the speed, the less is the distance that the masses, 13, 13 is displaced.

Having the masses constant and the displacement variable is the same as having the displacement constant and the masses variable. The former is more practicable than the latter, and hence it is incorporated in the transmission to give a torque which when plotted on graph paper will give a straight line. Since the power plot of an engine is a straight line, or nearly so, the transmission is the ideal one for the engine.

Since the transmission harnesses centrifugal force, the torque will be that due to the square of the speed, the formula being F equals $MV^2/R$ equals MV, letting R equal unity. It is readily seen that this formula will give a parabola plot with constant mass and constant displacement. But if the mass can be made to vary inversely as the speed, the plot will be a straight line. If the leaf spring is correctly designed, essentially this result can be obtained in my transmission.

The spring packs are so designed that the springs will not flex due to centrifugal force until the shaft 6 has attained a speed of, say, 500 R. P. M., said speed to be hereinafter referred to as the maximum idling speed. They are also so designed that the distance that the masses 13 are displaced from the center of the transmission, when the transmission is running above the maximum idling speed, shall vary inversely as the multiple of the idling speed.

Thus the formula for the torque delivered is practically that of centrifugal force, or F equals $MV^2$. In the invention, the distance the masses 13, 13 is displaced is not the same for all speeds, and hence the formula can be modified to $mhV^2$, where $h$ is the distance the masses are displaced. Since $m$ is constant, it can be eliminated, and the formula is simply $hv^2$. If maximum idling speed be unit speed, and $h$ vary inversely as the multiple of said maximum idling speed, then the torque plot for all speeds above maximum idling speed will be a straight line.

From the foregoing description, taken in connection with the accompanying drawings, it is thought that the construction, operation and advantages of my invention will be clear to those skilled in the art.

What I claim is:

1. In a power transmission mechanism, two shafts, one a driving shaft and the other a driven shaft, a sun gear on one shaft and a planet gear carried by the other shaft to mesh with the sun gear, a third shaft paralleling the other shafts, means to mount said third shaft to be carried by said other shaft with the planet gear, an Oldham-coupling between said third shaft and said planet gear, said third shaft being adapted to be moved from said other shaft by centrifugal force, and spring means acting on said third shaft against the centrifugal force.

2. In a power transmission mechanism, two shafts, one a driving shaft and the other a driven shaft, a sun gear on one shaft and a planet gear carried by the other shaft to mesh with the sun gear, a third shaft paralleling the other shafts, means to mount said third shaft to be carried by said other shaft with the planet gear, an Oldham-coupling between said third shaft and said planet gear, said third shaft being adapted to be moved from said other shaft by centrifugal force, and spring means acting on said third shaft against the centrifugal force, said spring means being designed to prevent said movement under centrifugal force when the speed of the driving shaft is below a predetermined amount.

3. In power transmission mechanism, two aligned shafts, one serving as a driving shaft and one as a driven shaft, a casing having bearings for said shafts, one shaft rotating in its bearing whereby the casing will turn with said other shaft as a unit, a sun gear on said one shaft, a planet gear rotatably mounted in said casing to mesh with said sun gear, a spring pack secured to said casing and having a shaft-bearing, a third shaft journalled in said shaft-bearing, to lie parallel to said two aligned shafts, and an Oldham-coupling between said third shaft and said planet gear.

4. In power transmission mechanism, two shafts, one being a driving shaft and the other a driven shaft, a plate secured to one of said shafts, a bearing for the other of said shafts, a sun gear on said other of said shafts, a planet gear rotatably journalled on said plate and meshing with said sun gear, a spring carried by said plate to be rotated with said plate as a unit with said planet gear around the axes of said two shafts, a third shaft, a bearing for said third shaft carried by said spring, and an Oldham-coupling between said third shaft and said planet gear, said third shaft and the elements of said coupling being movable away from said two shafts by centrifugal force resisted by said spring.

5. In power transmission mechanism, two shafts, one being a driving shaft and the other a driven shaft, a plate secured to one of said shafts, a bearing for the other of said shafts, a sun gear on said other of said shafts, a planet gear rotatably journalled on said plate and meshing with said sun gear, a spring carried by said plate to be rotated with said plate as a unit with said planet gear around the axes of said two shafts, a third shaft, a bearing for said third shaft carried by said spring, and an Oldham-coupling between said third shaft and said planet gear, said third shaft and the elements of said coupling being movable away from said two shafts by centrifugal force resisted by said spring, said spring being designed to supply sufficient counterforce to prevent movement of said third shaft away from said two shafts until a predetermined speed of the driving shaft has been reached.

6. In a power transmission mechanism, a casing comprising an annulus and end plates, one of which plates has a shaft bearing, a first shaft rotatable in said bearing and in part located in said casing, a second shaft coaxially disposed with respect to said first shaft and secured to the other end plate, a pair of sun gears secured within the casing to said first shaft and spaced apart, a planet gear rotatably mounted on each end plate to mesh with the respective sun gears, the axes of said planet gears being in alignment, a spring pack secured to a wall of said casing and having a free end projecting between said planet gears and having a shaft-bearing, a third shaft journalled in said shaft-bearing with its axis paralleling those of the other shafts and gears but lying, when the parts are at rest, closer to said first and second shafts' axes than do the axes of said planet gears, and an Oldham-coupling between said third shaft and each of said planet gears.

7. In a power transmission mechanism, a casing comprising an annulus and end plates, one of which plates has a shaft bearing, a first shaft rotatable in said bearing and in part located in said casing, a second shaft coaxially disposed with respect to said first shaft and secured to the other end plate, a pair of sun gears secured within the casing to said first shaft and spaced apart, a planet gear rotatably mounted on each end plate to mesh with the respective sun gears, the axes of said planet gears being in alignment, a spring pack secured to a wall of said casing and having a free end projecting between said planet gears and having a shaft-bearing, a third shaft journalled in said shaft-bearing with its axis paralleling those of the other shafts and gears but lying, when the parts are at rest, closer to said first and second shafts' axes than do the axes of said planet gears, and an Oldham-coupling between said third shaft and each of said planet gears, said spring pack being tensioned to resist flexure due to centrifugal force acting on the Oldham-coupling and said third shaft until the speed of rotation of the casing reaches a predetermined amount.

HENRY A. SMITT.